(12) United States Patent
Tsubamoto

(10) Patent No.: US 11,400,729 B2
(45) Date of Patent: Aug. 2, 2022

(54) INK JET RECORDING METHOD, INK SET, AND INK JET RECORDING APPARATUS

(71) Applicant: Seiko Epson Corporation, Tokyo (JP)

(72) Inventor: Satoshi Tsubamoto, Shiojiri (JP)

(73) Assignee: Seiko Epson Corporation

( * ) Notice: Subject to any disclaimer, the term of this patent is extended or adjusted under 35 U.S.C. 154(b) by 62 days.

(21) Appl. No.: 16/697,251

(22) Filed: Nov. 27, 2019

(65) Prior Publication Data
US 2020/0165477 A1    May 28, 2020

(30) Foreign Application Priority Data
Nov. 28, 2018    (JP) .............................. JP2018-221997

(51) Int. Cl.
*B41J 2/21*    (2006.01)
*C09D 11/40*    (2014.01)
(Continued)

(52) U.S. Cl.
CPC ........... *B41J 2/2114* (2013.01); *B41J 2/2107* (2013.01); *B41M 5/0017* (2013.01);
(Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596;
(Continued)

(56) References Cited

U.S. PATENT DOCUMENTS

2009/0226632 A1* 9/2009 Oberski ................. B41J 11/002
 427/511
2009/0295847 A1 12/2009 Mukai et al.
(Continued)

FOREIGN PATENT DOCUMENTS

JP    2010-006062 A    1/2010
JP    2015-143003 A    8/2015

*Primary Examiner* — Manish S Shah
(74) *Attorney, Agent, or Firm* — Harness, Dickey & Pierce, P.L.C.

(57) ABSTRACT

According to the present disclosure, an ink jet recording method includes depositing a resin liquid onto a non-absorption or low-absorption recording media and depositing an aqueous ink composition onto the recording medium by using an ink jet method, the recording medium including the resin liquid deposited on the recording medium, the aqueous ink composition having a total content of organic solvents of less than or equal to 12.0 mass % relative to the total mass of the aqueous ink composition.

18 Claims, 1 Drawing Sheet

(51) Int. Cl.
  *C09D 11/033*   (2014.01)
  *C09D 11/108*   (2014.01)
  *B41M 5/00*    (2006.01)
  *C09D 11/107*   (2014.01)
  *C09D 11/102*   (2014.01)

(52) U.S. Cl.
  CPC ......... *B41M 5/0023* (2013.01); *C09D 11/033* (2013.01); *C09D 11/102* (2013.01); *C09D 11/107* (2013.01); *C09D 11/108* (2013.01); *C09D 11/40* (2013.01)

(58) Field of Classification Search
  CPC ...... B41J 2/16508; B41J 2/1652; B41J 2/175; B41J 2/17563; B41M 5/0011; B41M 5/0017; B41M 5/0023; B41M 5/0047; B41M 7/00; B41M 7/0072; B41M 5/52; B41M 5/5218; B41M 5/5227; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106
  See application file for complete search history.

(56) References Cited

U.S. PATENT DOCUMENTS

| | | | |
|---|---|---|---|
| 2010/0086692 A1* | 4/2010 | Ohta | C09D 11/322 427/256 |
| 2011/0200799 A1* | 8/2011 | Mukai | B41J 2/2114 428/195.1 |
| 2011/0234683 A1* | 9/2011 | Komatsu | B41J 2/2114 347/20 |
| 2013/0202861 A1* | 8/2013 | Ohta | B41J 2/2107 428/205 |
| 2015/0174939 A1 | 6/2015 | Aoyama et al. | |
| 2015/0328904 A1* | 11/2015 | Yano | B41J 11/0015 347/21 |
| 2016/0251532 A1* | 9/2016 | Yano | B41J 2/2114 347/21 |
| 2017/0292035 A1* | 10/2017 | Saito | B41J 2/01 |

* cited by examiner

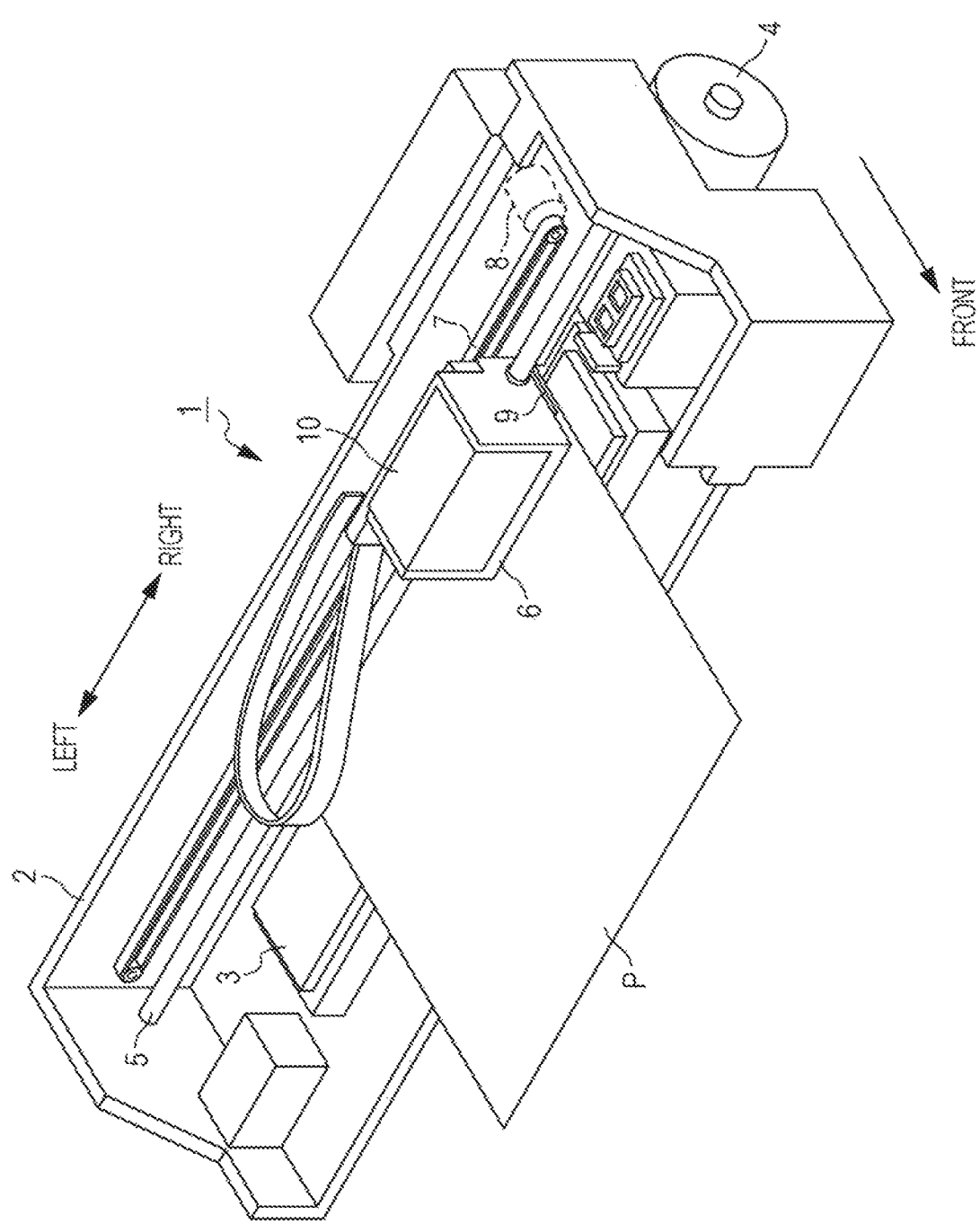

INK JET RECORDING METHOD, INK SET, AND INK JET RECORDING APPARATUS

The present application is based on, and claims priority from, JP Application Serial Number 2018-221997, filed Nov. 28, 2018, the disclosure of which is hereby incorporated by reference herein in its entirety.

BACKGROUND

1. Technical Field

The present disclosure relates to an ink jet image recording method, an ink set, and an ink jet recording apparatus.

2. Related Art

An ink jet recording method is a recording method in which recording is performed by ejecting and depositing ink droplets onto a recording medium, such as paper. With recent advancements in ink jet recording technology, ink jet recording methods have come to be used not only for image recording on a high-ink-absorption recording medium (e.g., plain paper) but also for image recording on a low-ink-absorption or non-ink-absorption recording medium (e.g., a plastic film). As ink compositions that are used for image recording on such low-ink-absorption or non-ink-absorption recording media, water-based aqueous ink compositions have been disclosed from environmental and safety standpoints, for instance.

For example, JP-A-2010-6062 discloses an ink jet recording method for low-ink-absorption or non-ink-absorption recording media. One problem with images recorded by using an aqueous ink composition is insufficient abrasion resistance, and to solve this problem, JP-A-2010-6062 discloses the following. An aqueous ink composition is deposited onto a recording medium, and after this step, a resin ink that includes resin particles and does not include colorants is deposited onto the image formed by depositing the aqueous ink composition, thereby improving abrasion resistance.

Furthermore, for example, JP-A-2015-143003 discloses a recording method in which a resin liquid that includes resin particles and does not include colorants is deposited onto a low-ink-absorption or non-ink-absorption recording medium to modify the surface of the recording medium, thereby improving wetting and spreading of images and abrasion resistance of images.

Unfortunately, even in cases in which the image recording method disclosed in JP-A-2010-6062 or JP-A-2015-143003 is used, problems arise; abrasion resistance tends to be insufficient and/or lamination strength is insufficient.

SUMMARY

The disclosure of the present application includes the following.

1. An ink jet recording method including depositing a resin liquid onto a recording medium, the resin liquid including a resin, and depositing an aqueous ink composition, by using an inkjet method, on which the resin liquid was deposited, wherein, in the aqueous ink composition, a total content of organic solvents is less than or equal to 12.0 mass % relative to a total mass of the aqueous ink composition.

2. The ink jet recording method according to 1, wherein, in the depositing of the resin liquid, an amount of the resin included in the resin liquid deposited onto the recording medium is 0.05 mg/inch$^2$ or greater and 0.35 mg/inch$^2$ or less.

3. The ink jet recording method according to 1 or 2, wherein, in the aqueous ink composition, the at least one organic solvent is selected from the group consisting of 1,2-alkanediols and glycol ethers.

4. The ink jet recording method according to any one of 1 to 3, wherein, in the aqueous ink composition, a total content of organic solvents having a normal boiling point higher than 280° C. is less than or equal to 1.0 mass % relative to the total mass of the aqueous ink composition.

5. The ink jet recording method according to any one of 1 to 4, wherein, in the aqueous ink composition, the total content of organic solvents is less than or equal to 5.0 mass % relative to the total mass of the aqueous ink composition.

6. The ink jet recording method according to any one of 1 to 5, wherein a recording surface of the recording medium includes a film made from a polyolefin.

7. The ink jet recording method according to any one of 1 to 6, wherein, in the resin liquid, a total content of organic solvents is less than or equal to 12.0 mass % relative to a total mass of the resin liquid.

8. The ink jet recording method according to any one of 1 to 7, wherein the aqueous ink composition has a viscosity, at 20° C., of less than or equal to 4 mPa·s.

9. The ink jet recording method according to any one of 1 to 8, wherein the resin liquid includes at least one urethane-based resin, and the aqueous ink composition includes at least one selected from the group consisting of acrylic-based resins and urethane-based resins.

10. The ink jet recording method according to any one of 1 to 9, wherein the aqueous ink composition includes a resin, and a total of an amount of the resin included in the resin liquid and an amount of the resin included in the aqueous ink composition is less than or equal to 0.8 mg/inch$^2$ in a region where the resin liquid and the aqueous ink composition are deposited onto the recording medium.

11. The ink jet recording method according to any one of 1 to 10, wherein the resin included in the resin liquid is in a form of resin microparticles.

12. The ink jet recording method according to any one of 1 to 11, wherein, in the depositing of the resin liquid, the resin liquid is deposited onto the recording medium by using an ink jet recording method.

13. The ink jet recording method according to any one of 1 to 12, wherein recorded matter obtained by using the ink jet recording method is laminated to be put into use.

14. The ink jet recording method according to any one of 1 to 13, wherein a ratio of an amount of deposition of a resin of the aqueous ink composition to an amount of deposition of the resin of the resin liquid is greater than or equal to 1 in a region where the resin liquid and the aqueous ink composition are deposited onto the recording medium.

15. An ink set including: an aqueous ink jet ink composition; and a resin liquid, wherein, in the aqueous ink jet ink composition, a total content of organic solvents is less than or equal to 12.0 mass % relative to a total mass of the aqueous ink jet ink composition, and the resin liquid is used as a priming liquid for the aqueous ink jet ink composition.

16. An ink jet recording apparatus including: a mechanism that deposits a resin liquid onto a recording medium, the resin liquid including a resin; and a mechanism that deposits an aqueous ink composition onto the recording medium by using an ink jet method, the recording medium including the resin liquid deposited on the recording medium, wherein, in the aqueous ink composition, a total content of organic solvents is less than or equal to 12.0 mass % relative to a total mass of the aqueous ink composition.

BRIEF DESCRIPTION OF THE DRAWINGS

FIG. 1 is a perspective view illustrating a general configuration of an ink jet recording apparatus.

DESCRIPTION OF EXEMPLARY EMBODIMENTS

The following description describes a resin liquid and an aqueous ink composition that are used in an ink jet recording method of an embodiment.

Resin Liquid

The resin liquid includes at least a resin and is in a liquid state at normal temperature and pressure. Preferably, an organic solvent and water may be included as solvent components. The resin liquid may include, as necessary, a surfactant and one or more other components, examples of which include a pH-adjusting agent, a preservative, a fungicide, and a corrosion inhibitor.

In the recording method, the resin liquid is used by being deposited onto a recording medium. The ink composition is deposited to overlap the resin liquid-deposited region of the recording medium. Herein, a resin liquid used in such a manner is referred to as a "resin liquid used as a priming liquid for an ink composition".

The resin liquid is not intended to be used and deposited for the purpose of coloring a recording medium. Accordingly, in the resin liquid, the content of a colorant is preferably less than or equal to 0.1 mass %, more preferably less than or equal to 0.05 mass %, and even more preferably less than or equal to 0.02 mass %. The resin liquid may be free of colorants.

Resin

The resin included in the resin liquid may be one or more known resins, examples of which include polyester-based resins, acrylic-based resins, urethane-based resins, and polyolefin-based resins. It is preferable that the resin included be in the form of resin microparticles. In the case in which the resin is included in the form of a resin emulsion including resin microparticles dispersed in an aqueous medium, resin liquid storage stability is improved, and stable ejection is achieved in the ink jet recording method. Accordingly, resin emulsions are preferable. In addition, excellent abrasion resistance and lamination strength, for example, can be achieved, and therefore resin emulsions are preferable.

Among the resins mentioned above, a preferred resin to be included in the resin liquid of the present embodiment is one or more urethane-based resins. Inclusion of a urethane-based resin produces an effect of increasing the wettability of an adhesion layer that is to be formed on a recording medium and an effect of improving adhesion to the recording medium. Specifically, it is preferable to use a urethane-based resin emulsion.

The urethane-based resin emulsion is not particularly limited provided that the resin emulsion has a urethane linkage in the molecule. Examples of the urethane-based resin include polyether-type urethane-based resins having an ether linkage in the backbone, polyester-type urethane-based resins having an ester linkage in the backbone, and polycarbonate-type urethane-based resins having a carbonate linkage in the backbone. The urethane-based resin emulsion may be a commercially available product, examples of which include, but are not limited to, SANCURE 2710 (trade name of The Lubrizol Corporation); PERMARIN UA-150 (trade name of Sanyo Chemical Industries, Ltd.); Superflex series 460, 470, 610, and 700 (trade names of Dai-Ichi Kogyo Seiyaku Co., Ltd.); NeoRez series R-9660, R-9637, and R-940 (trade names of Kusumoto Chemicals, Ltd.); ADEKA BONTIGHTER series HUX-380 and HUX-290K (trade names of ADEKA CORPORATION); TAKE-LAC (registered trademark) series W-605, W-635, W-6061, and WS-6021 (trade names of Mitsui Chemicals, Inc.); and a polyether (Tg: 20° C., commercially available from Taisei Fine Chemical Co., Ltd.). These urethane-based resin emulsions may be used alone or in a combination of two or more.

It is preferable that the amount of the resin included in the resin liquid be 1.0 mass % or greater and 15.0 mass % or less relative to the total mass of the resin liquid. It is more preferable that the amount be 1.0 mass % or greater and 10.0 mass % or less. When the amount of the resin included in the resin liquid is within any of the above-mentioned ranges, the effect of increasing the wettability of the adhesion layer that is to be formed on a recording medium and the effect of improving adhesion of the aqueous ink composition are enhanced. Furthermore, when the amount of the resin is less than or equal to 10.0 mass %, stable ejection is achieved in the ink jet recording method.

Organic Solvent

Examples of organic solvents that may be included in the resin liquid include 1,2-alkanediols, polyhydric alcohols, nitrogen-containing solvents, and glycol ethers. In particular, 1,2-alkanediols and glycol ethers are preferable in terms of providing excellent image quality and abrasion resistance to recorded matter.

Examples of 1,2-alkanediols include 1,2-butanediol, 1,2-pentanediol, 1,2-hexanediol, and 1,2-octanediol. 1,2-alkanediols have an excellent capability to increase the wettability of the resin liquid to a recording medium to achieve uniform wetting. That is, using a 1,2-alkanediol is preferable. The 1,2-alkanediol may be an alkanediol having 4 or more carbon atoms, preferably, having 5 or more carbon atoms. It is preferable that the upper limit of the carbon number be 10 or less.

Examples of polyhydric alcohols include ethylene glycol, diethylene glycol, propylene glycol (1,2-propanediol), dipropylene glycol, 1,3-propanediol, 1,4-butanediol, 1,6-hexanediol, trimethylolpropane, and glycerol. Using a polyhydric alcohol improves the moisture retention of the resin liquid, which results in stable ejection in the ink jet recording method. The polyhydric alcohol may be an alkanediol having 3 or fewer carbon atoms, a product of intermolecular condensation between hydroxyl groups of alkanediols having 3 or fewer carbon atoms, an alkanediol that has 4 or more carbon atoms but which is not a 1,2-alkanediol, or an alcohol having 3 or more hydroxyl groups. It is preferable that the alkanediol that has 4 or more carbon atoms but which is not a 1,2-alkanediol have 10 or fewer carbon atoms.

Examples of nitrogen-containing solvents include pyrrolidone derivatives and acyclic amides. Examples of pyrrolidone derivatives include N-methyl-2-pyrrolidone, N-ethyl-2-pyrrolidone, N-vinyl-2-pyrrolidone, 2-pyrrolidone, N-butyl-2-pyrrolidone, and 5-methyl-2-pyrrolidone.

Examples of acyclic amides include alkoxyalkylamides, examples of which include 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-propoxy-N,N-methylethylpropionamide, 3-iso-propoxy-N,N-dimethylpropionamide, 3-iso-propoxy-N,N-diethylpropionamide, 3-iso-propoxy-N,N-methylethylpropionamide, 3-tert-butoxy-N,N-dimethylpropionamide, 3-tert-butoxy-N,N-diethylpropionamide, and 3-tert-butoxy-N,N-methylethylpropionamide. In cases in which a nitrogen-containing solvent is used, the nitrogen-containing solvent acts as a favorable solubilizer for the resin.

Examples of glycol ethers include ethylene glycol monoisobutyl ether, ethylene glycol monohexyl ether, ethylene glycol monoisohexyl ether, diethylene glycol monohexyl ether, triethylene glycol monohexyl ether, diethylene glycol monoisohexyl ether, triethylene glycol monoisohexyl ether, ethylene glycol monoisoheptyl ether, diethylene glycol monoisoheptyl ether, triethylene glycol monoisoheptyl ether, ethylene glycol monooctyl ether, ethylene glycol monoisooctyl ether, diethylene glycol monoisooctyl ether, triethylene glycol monoisooctyl ether, ethylene glycol mono-2-ethylhexyl ether, diethylene glycol mono-2-ethylhexyl ether, triethylene glycol mono-2-ethylhexyl ether, diethylene glycol mono-2-ethylpentyl ether, ethylene glycol mono-2-ethylpentyl ether, ethylene glycol mono-2-methylpentyl ether, diethylene glycol mono-2-methylpentyl ether, propylene glycol monobutyl ether, dipropylene glycol monobutyl ether, tripropylene glycol monobutyl ether, propylene glycol monopropyl ether, dipropylene glycol monopropyl ether, and tripropylene glycol monomethyl ether. These may be used alone or in a mixture of two or more. By using a glycol ether, the wettability of the resin liquid with respect to a recording medium can be controlled, for example. The glycol ether may be a monoether or diether of an alkanediol. It is preferable that the ether be an alkyl ether. Glycol ethers also increase the wettability of ink with respect to a recording medium and are therefore preferable.

It is preferable that the content of the organic solvent be 0.1 mass % or greater and 30.0 mass % or less relative to the total mass of the resin liquid. More preferably, the content is less than or equal to 12.0 mass %, even more preferably less than or equal to 10.0 mass %, particularly preferably less than or equal to 7.0 mass %, and more particularly preferably less than or equal to 5.0 mass %, relative to the total mass of the resin liquid. Furthermore, the content of the organic solvent is preferably greater than or equal to 0.5 mass %, more preferably greater than or equal to 1.0 mass %, and even more preferably greater than or equal to 3.0 mass %, relative to the total mass of the resin liquid. When the amount of the organic solvent included in the resin liquid is less than or equal to the upper limit mentioned above, the amount of a portion of the organic solvent that remains in the adhesion layer is reduced, which results in improved abrasion resistance. Furthermore, when the content is greater than or equal to the lower limit mentioned above, excellent image quality is achieved.

The organic solvent is preferably an organic solvent having a normal boiling point lower than or equal to 280° C., more preferably lower than or equal to 270° C., and even more preferably lower than or equal to 250° C. Furthermore, the normal boiling point is preferably higher than or equal to 160° C., more preferably higher than or equal to 180° C., and even more preferably higher than or equal to 200° C.

Furthermore, the total content of organic solvents having a normal boiling point higher than 280° C. is preferably less than or equal to 3 mass %, more preferably less than or equal to 2 mass %, even more preferably less than or equal to 1 mass %, and particularly preferably less than or equal to 0.5 mass %, relative to the total mass of the resin liquid. Such a content results in excellent abrasion resistance, for example, and is therefore preferable.

Water

Water is included in the ink composition, which will be described later, and may be included in the resin liquid. Water serves as a principal medium for the ink composition and the resin liquid and is a component that evaporates and spreads upon drying. It is preferable that the water be pure water, such as ion-exchanged water, ultrafiltrated water, reverse osmosis water, or distilled water, or water obtained by removing ionic impurities as much as possible, such as ultrapure water. Furthermore, using water sterilized by, for example, UV irradiation or addition of hydrogen peroxide prevents the formation of fungi and bacteria during storage of the resin liquid.

The content of water in the resin liquid and the content of water in the ink composition, which will be described later, are preferably greater than or equal to 45.0 mass % and more preferably greater than or equal to 50.0 mass % and are preferably less than or equal to 95.0 mass %, respectively, relative to the total mass of the resin liquid and the total mass of the ink composition. More preferably, the contents are 75.0 mass % or greater and 90.0 mass % or less. When the water contents are within any of the above-mentioned ranges, the resin adhesion layer can be formed rapidly, via evaporation of moisture from the recording medium.

It is preferable that the compositions, that is, the resin liquid and the ink composition, be aqueous compositions including at least water as a principal solvent component. In the aqueous composition, it is preferable that the content of water relative to the amount of the composition be greater than or equal to 45.0 mass %.

Surfactant

The resin liquid may include a surfactant. Surfactants have a function of reducing the surface tension of the resin liquid, thereby improving the wettability thereof with respect to a recording medium. Examples of preferred surfactants that may be used include acetylene glycol-based surfactants and silicone-based surfactants.

Examples of acetylene glycol-based surfactants include commercially available products, examples of which include, but are not limited to, Surfynol series 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (trade names of Air Products and Chemicals. Inc.); OLFINE series B, Y, P, A, STG, SPC, E1004, E1010, PD-001, PD-002W, PD-003, PD-004, EXP. 4001, EXP. 4036, EXP. 4051, AF-103, AF-104, AK-02, SK-14, and AE-3 (trade names of Nissin Chemical Co., Ltd.); and Acetylenol series E00, E00P, E40, and E100 (trade names of Kawaken Fine Chemicals Co., Ltd.).

Examples of preferred silicone-based surfactants include, but are not limited to, polysiloxane-based compounds. Examples of commercially available products include BYK-306, BYK-307, BYK-333, BYK-341, BYK-345, BYK-346, BYK-347, BYK-348, and BYK-349 (trade names of BYK Japan KK) and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (trade names of Shin-Etsu Chemical Co., Ltd.). A silicone-based surfactant may be used alone or two or more silicone-based surfactants may be used in combination.

The content of the surfactant may be 0.1 mass % or greater and 1.5 mass % or less relative to the total mass of the resin liquid.

Other Components

The resin liquid may include, as necessary, a pH adjusting agent, a preservative, a fungicide, and a corrosion inhibitor.

Examples of the pH adjusting agent include, but are not limited to, potassium dihydrogen phosphate, disodium hydrogen phosphate, sodium hydroxide, lithium hydroxide, potassium hydroxide, ammonia, diethanolamine, triethanolamine, triisopropanolamine, potassium carbonate, sodium carbonate, and sodium hydrogen carbonate.

Examples of the preservative and the fungicide include, but are not limited to, sodium benzoate, sodium pentachlorophenol, 2-pyridinethiol-1-oxide sodium, sodium sorbate, sodium dehydroacetate, and 1,2-dibenzisothiazolin-3-one. Examples of commercially available products include Proxel XL2 and Proxel GXL (trade names of Avecia Ltd.) and Denicide CSA and NS-500W (trade names of Nagase ChemteX Corporation).

Examples of the corrosion inhibitor include, but are not limited to, benzotriazoles.

Aqueous Ink Composition

The aqueous ink composition includes a colorant and water. The aqueous ink composition may further include a resin and an organic solvent. The aqueous ink composition may include, as necessary, a surfactant and one or more other components, such as a pH adjusting agent, a preservative, a fungicide, a corrosion inhibitor, and a chelating agent. It is preferable that the colorant to be included in the aqueous ink composition be a pigment. The following description describes components that are to be included or may be included in the aqueous ink composition. The aqueous ink composition may include components that are to be included or may be included in the resin liquid described above. The types of the components and the contents of the components in the ink composition may be as described above and may be independent of the types and the contents employed for the resin liquid.

The ink composition is used by being deposited onto a recording medium to color the recording medium. An ink composition that is used for recording by being ejected from an ink jet head and deposited onto a recording medium is referred to as an "ink jet ink composition".

Colorant

Examples of colorants that may be included in the aqueous ink composition include pigments and dyes. Pigments are preferable in terms of providing excellent abrasion resistance, for example. The pigment may be an inorganic pigment or organic pigment known in the art.

Carbon black is used as a pigment for an aqueous black ink composition. Examples of carbon black include, but are not limited to, No. 2300, No. 900, MCF88, No. 33, No. 40, No. 45, No. 52, MA7, MA8, MA100, and No. 2200B (all manufactured by Mitsubishi Chemical Corporation); Raven 5750, Raven 5250, Raven 5000, Raven 3500, Raven 1255, and Raven 700 (all manufactured by Columbia Carbon, Inc.); Regal 400R, Regal 330R, Regal 660R, Mogul L, Monarch 700, Monarch 800, Monarch 880, Monarch 900, Monarch 1000, Monarch 1100, Monarch 1300, and Monarch 1400 (all manufactured by Cabot Japan K.K.); Color Black FW1, Color Black FW2, Color Black FW2V, Color Black FW18, Color Black FW200, Color Black 5150, Color Black 5160, Color Black 5170, Printex 35, Printex U, Printex V, Printex 140U, Special Black 6, Special Black 5, Special Black 4A, and Special Black 4 (all manufactured by Degussa).

Examples of pigments that may be used for an aqueous white ink composition include, but are not limited to, C.I. (Colour Index Generic Name) Pigment Whites 6, 18, and 21, titanium oxide, zinc oxide, zinc sulfide, antimony oxide, zirconium oxide, and white hollow resin particles and polymer particles.

One or more other pigments that may be used may be organic pigments. Examples of organic pigments include quinacridone-based pigments, quinacridone quinone-based pigments, dioxazine-based pigments, phthalocyanine-based pigments, anthrapyrimidine-based pigments, anthanthrone-based pigments, indanthrone-based pigments, flavanthrone-based pigments, perylene-based pigments, diketopyrrolopyrrole-based pigments, perinone-based pigments, quinophthalone-based pigments, anthraquinone-based pigments, thioindigo-based pigments, benzimidazolone-based pigments, isoindolinone-based pigments, azomethine-based pigments, and azo-based pigments. Specific examples of organic pigments include the following.

Examples of pigments that may be used for a cyan ink include, but are not limited to, C.I. Pigment Blues 1, 2, 3, 15, 15:1, 15:2, 15:3, 15:4, 15:6, 15:34, 16, 18, 22, 60, 65, and 66; and C.I. Vat Blues 4 and 60.

Examples of pigments that may be used for a magenta ink include, but are not limited to, C.I. Pigment Reds 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, 245, 254, and 264; and C.I. Pigment Violets 19, 23, 32, 33, 36, 38, 43, and 50.

Examples of pigments that may be used for a yellow ink include, but are not limited to, C.I. Pigment Yellows 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, 180, 185, and 213.

Examples of pigments other than those mentioned above include, but are not limited to, C.I. Pigment Greens 7 and 10; C.I. Pigment Browns 3, 5, 25, and 26; and C.I. Pigment Oranges 1, 2, 5, 7, 13, 14, 15, 16, 24, 34, 36, 38, 40, 43 and 63.

It is preferable that the content of the colorant be 0.2 mass % or greater and 10.0 mass % or less relative to the total mass of the aqueous ink composition. It is more preferable that the content be 2.5 mass % or greater and 7.5 mass % or less. When the content of the colorant is within any of the above-mentioned ranges, color development in recorded matter is enhanced, the recorded matter being the resultant of deposition of the aqueous ink composition.

To increase the dispersibility of the pigment in the aqueous ink composition, the pigment may be surface-treated or a dispersant or the like may be added to the aqueous ink composition. The surface treatment of the pigment is a process of introducing hydrophilic groups, such as carboxyl groups or sulfone groups, to the surface of the pigment by physical treatment or by chemical treatment. When the pigment is surface-treated, the pigment can be readily dispersed in the medium of the aqueous ink composition.

The dispersant that may be used in the aqueous ink composition has a function such that a hydrophobic moiety of the molecular structure adsorbs onto the surface of the pigment particles, and a hydrophilic moiety of the molecular structure is oriented toward the medium. This function enables the pigment to be readily dispersed in the medium. The dispersant may be a surfactant or resin known in the art. Another possible process is to coat the pigment particles with a dispersing resin, thereby imparting dispersibility. Examples of methods that may be employed to coat the pigment particles include acid precipitation methods, phase inversion emulsification methods, and mini-emulsion polymerization methods.

Resin

Examples of resins that may be included in the aqueous ink composition include known resins, such as polyester-based resins, acrylic-based resins, urethane-based resins, and polyolefin-based resins. In particular, it is preferable that the resin include resin microparticles. In the case in which the resin is included in the form of a resin emulsion including resin microparticles dispersed in an aqueous medium, ink composition storage stability is improved, and stable ejection is achieved in the ink jet recording method.

Among the resins mentioned above, a preferred resin to be included in the aqueous ink composition of the present embodiment is at least one selected from the group consisting of acrylic-based resins and urethane-based resins. That is, it is preferable that the resin to be included in the aqueous ink composition be at least one selected from the group consisting of acrylic-based resin emulsions and urethane-based resin emulsions. This is because an effect of improving adhesion to a recording medium is produced, and a resin coating on the surface of recorded matter can be rigid, which results in improved abrasion resistance.

The acrylic-based resins are resins obtained by using and polymerizing at least one (meth)acrylic-based monomer. Examples of the (meth)acrylic-based monomer include, but are not limited to, (meth)acrylic acids, (meth)acrylic acid esters, and (meth)acrylamides. In addition, examples of the acrylic-based resins include copolymers of a (meth)acrylic-based monomer and another monomer. Examples of the other monomer include vinyl-based monomers, such as styrene. Examples of the copolymers include a styrene acrylic resin, which is a copolymer of styrene and a (meth)acrylic-based monomer. The term "(meth)acrylic" is meant to include "methacrylic" and "acrylic".

It is preferable that the acrylic-based resin be an acrylic-based resin emulsion. Examples of commercially available products of acrylic-based resins or resin emulsions include, but are not limited to, Mowinyl 966A (trade name of The Nippon Synthetic Chemical Industry Co., Ltd.); Micro Gel E-1002 and Micro Gel E-5002 (trade names of Nippon Paint Co., Ltd.); Voncoat 4001 and Voncoat 5454 (trade names of DIC Corporation); SAE-1014 (trade name of Zeon Corporation); Saibinol SK-200 (trade name of Saiden Chemical Industry Co., Ltd.); Joncryl 7100, Joncryl 390, Joncryl 711, Joncryl 511, Joncryl 7001, Joncryl 632, Joncryl 741, Joncryl 450, Joncryl 840, Joncryl 62J, Joncryl 74J, Joncryl HRC-1645J, Joncryl 734, Joncryl 852, Joncryl 7600, Joncryl 775, Joncryl 537J, Joncryl 1535, Joncryl PDX-7630A, Joncryl 352J, Joncryl 352D, Joncryl PDX-7145, Joncryl 538J, Joncryl 7640, Joncryl 7641, Joncryl 631, Joncryl 790, Joncryl 780, and Joncryl 7610 (trade names of BASF); and NK binder R-5HN (trade name of Shin Nakamura Chemical Co., Ltd., solids content: 44%).

Specific examples of urethane-based resin emulsions are similar to the resin emulsions presented as examples in the description of the resin liquid, and therefore a description thereof is omitted here.

It is preferable that the amount of the resin included in the aqueous ink composition be 1.0 mass % or greater and 15.0 mass % or less relative to the total mass of the aqueous ink composition. It is more preferable that the amount be 1.0 mass % or greater and 10.0 mass % or less. When the amount of the resin included in the aqueous ink composition is within any of the above-mentioned ranges, a similar effect to that of the resin liquid described above can be produced.

Organic Solvent

Examples of organic solvents that may be included in the aqueous ink composition include 1,2-alkanediols, polyhydric alcohols, nitrogen-containing solvents, and glycol ethers. 1,2-alkanediols and glycol ethers are preferable. Organic solvents that may be used are similar to the organic solvents presented as examples in the description of the resin liquid, and therefore a description thereof is omitted here.

When one or more of the organic solvents mentioned above is included, an effect similar to that produced with the resin liquid described above is produced.

The content of the organic solvent in the aqueous ink composition is less than or equal to 12.0 mass % relative to the total mass of the aqueous ink composition. More preferably, the content is less than or equal to 10.0 mass %, even more preferably less than or equal to 7.0 mass %, and particularly preferably less than or equal to 5.0 mass %, relative to the total mass of the aqueous ink composition. Furthermore, the content of the organic solvent is preferably greater than or equal to 0.5 mass %, more preferably greater than or equal to 1.0 mass %, and particularly preferably greater than or equal to 3.0 mass %, relative to the total mass of the aqueous ink composition.

If the organic solvents included in the resin liquid and the aqueous ink composition, which are deposited on a recording medium, are not sufficiently evaporated, portions of the organic solvents remain on recorded matter. The residual portions of the organic solvents on recorded matter impair the uniformity of the cured coating of resin particles, which tends to result in an insufficient abrasion resistance. Thus, when the content of the organic solvent in the aqueous ink composition is less than or equal to the upper limit mentioned above, a uniform resin coating can be easily formed, which results in improved abrasion resistance. Furthermore, when the content is greater than or equal to the lower limit mentioned above, excellent image quality is achieved.

Furthermore, the total content of organic solvents having a normal boiling point higher than 280° C. is preferably less than or equal to 3 mass %, more preferably less than or equal to 2 mass %, even more preferably less than or equal to 1 mass %, and particularly preferably less than or equal to 0.5 mass %, relative to the total mass of the aqueous ink composition. Such a content results in excellent abrasion resistance, for example, and is therefore preferable.

Water

The aqueous ink composition includes water. With regard to the water, a similar description to that for the resin liquid described above applies, and therefore a description thereof is omitted here.

Surfactant

The aqueous ink composition may include a surfactant. Surfactants have a function of reducing surface tension, thereby improving wettability with respect to a recording medium. Examples of preferred surfactants that may be used include acetylene glycol-based surfactants and silicone-based surfactants. With regard to the surfactant, similar specific examples and ranges of the content to those for the resin liquid described above apply, and therefore a description thereof is omitted here.

Other Components

The aqueous ink composition may include, as necessary, a pH adjusting agent, a preservative, a fungicide, a corrosion inhibitor, and a chelating agent. With regard to these components, similar specific examples to those presented for the resin liquid described above apply, and therefore a description thereof is omitted here.

It is preferable that the aqueous ink composition have a viscosity, at 20° C., of less than or equal to 4 mPa·s (millipascal seconds). When the viscosity is within the above-mentioned range, stable ejection is achieved in the ink jet recording method. Note that the viscosity can be measured by using, for example, an MCR-300 (trade name of Physica) rheometer. Specifically, the measurement can be carried out by adjusting the temperature of the aqueous ink composition to 20° C., increasing the shear rate from 0.01 $s^{-1}$ to 1.00 $s^{-1}$, and taking a reading of viscosity obtained at a shear rate of 0.10 $s^{-1}$.

The following description describes an ink jet recording apparatus, a recording medium, and an ink jet recording method according to embodiments.

Ink Jet Recording Apparatus

A recording apparatus according to an embodiment will now be described with reference to the drawing.

FIG. 1 is a perspective view illustrating a general configuration of the ink jet recording apparatus of the present embodiment. As illustrated in FIG. 1, an ink jet printer 1, which is an example of the ink jet recording apparatus, includes a frame 2. The frame 2 is provided with a platen 3. A recording medium P can be fed forward on the platen 3 by actuating a recording medium feeding motor 4. The frame 2 is also provided with a guide member 5, which has a rod shape. The guide member 5 extends parallel to a longitudinal direction of the platen 3. A carriage 6 is supported by the guide member 5 in a manner such that the carriage 6 can reciprocate in an axial direction of the guide member 5, that is, in a left and right direction. The carriage 6 is coupled to a carriage motor 8 via a timing belt 7, which is provided within the frame 2. The carriage 6 can be reciprocated along the guide member 5 by actuating the carriage motor 8.

The cartridge 6 is provided with a head 9. An ink cartridge 10 is attachably and detachably disposed on the cartridge 6. The ink cartridge 10 is provided to supply the aqueous ink composition, which is in a liquid state, to the head 9. The aqueous ink composition within the ink cartridge 10 can be supplied from the ink cartridge 10 to the head 9 by actuating a piezoelectric element (not illustrated) included in the head 9. Through a plurality of nozzles formed in a nozzle-forming surface of the head 9, the aqueous ink composition can be ejected onto the recording medium P, which is fed onto the platen 3. In this manner, recorded matter can be produced.

In the head 9, a piezoelectric element is used as an actuator (actuating means), but this configuration is a non-limiting example. Other examples of actuators that may be used include electromechanical transducers in which an actuator diaphragm is configured to be displaced by electrostatic adsorption and electrothermal transducers that cause droplets of the aqueous ink composition to be ejected by utilizing air bubbles formed by heating the aqueous ink composition.

The apparatus illustrated in FIG. 1 is a serial-type ink jet recording apparatus. It is also possible to use a line-type ink jet recording apparatus. In a line-type ink jet recording apparatus, the head (ink jet head) is configured as a line head that extends in a width direction of a recording medium and has a length in a width direction of the head greater than or equal to a length of the recording region of the recording medium in the width direction. The line head is held at a fixed position during recording. Recording is carried out by performing scanning once, in which ink is ejected from the line head to deposit the ink onto a recording medium while the recording medium is being transferred. This is a line-type ink jet recording method. It is also possible that a plurality of line heads may be arranged in a recording medium transfer direction, from upstream to downstream, and different compositions may be ejected from the respective different line heads to accomplish recording using a plurality of types of compositions. In the case in which a line-type ink jet recording apparatus is employed as the recording apparatus, the configuration of the recording apparatus may be similar to the configuration of the apparatus illustrated in FIG. 1 except for the configuration of the ink jet head and the method for recording.

Ink Set

An ink set according to an embodiment includes an aqueous ink jet ink composition and a resin liquid. In the aqueous ink jet ink composition, the total content of organic solvents is less than or equal to 12.0 mass % relative to the total mass of the aqueous ink jet ink composition. The resin liquid is used as a priming liquid for the aqueous ink jet ink composition. The aqueous ink jet ink composition and the resin liquid may be the aqueous ink composition and the resin liquid described previously.

Recording Medium

A recording medium is a medium onto which the resin liquid and the aqueous ink composition are to be deposited by using the ink jet recording apparatus described above. Examples of the recording medium include absorptive recording media, non-absorption recording media, and low-absorption recording media. In particular, non-absorption recording media and low-absorption recording media are preferable.

Examples of low-absorption recording media include, but are not limited to, coated paper including a coating layer on the surface. The coating layer is a layer for receiving an oil-based ink. Examples of coated paper include, but are not limited to, printing paper, such as art paper, coat paper, and matte paper.

Examples of non-absorption recording media include, but are not limited to, a plastic film free of an ink absorption layer, a medium in which a substrate, such as paper, is coated with a plastic, and a medium in which a plastic film is bonded to such a substrate. As referred to herein, the plastic include polyolefins, polyvinyl chlorides, polyethylene terephthalates, polycarbonates, polystyrenes, polyurethanes, polyethylenes, polypropylenes, and the like. In addition to the recording media mentioned above, examples of non-ink-absorption recording media and low-ink-absorption recording media include metal plates and glass media. Examples of the metal include iron, silver, copper, and aluminum.

In the case in which the ink composition and the resin liquid of the present embodiment are used with a non-absorption recording medium, particularly high abrasion resistance and lamination strength are achieved, and therefore non-ink-absorption recording media are preferable. In particular, plastic films in which the recording surface is formed of a polyolefin are preferable. Examples of the polyolefin include polypropylenes and polyethylenes.

As described above, in the case in which a recording medium without an ink absorption layer is used, the resin liquid is not absorbed into the recording medium when deposited onto the recording medium, and therefore the resin liquid can readily form an adhesion layer on the recording medium.

As defined herein, low-absorption recording media and non-absorption recording media, mentioned above, are recording media having a water absorption of less than or equal to 10 mL/m², which is an amount for a period of 30 msec from the start of contact, as determined by the Bristow method. The Bristow method is the most common method among methods for measuring a short-period liquid absorption and is also employed by Japan Technical Association of the Pulp and Paper Industry (Japan TAPPI). Details of the test method are set forth in Standard No, 51, "Paper and Paperboard-Liquid Absorbency Test Method-Bristow Method" of "JAPAN TAPPI Paper and Pulp Test Methods, 2000 Edition".

Ink Jet Recording Method

An ink jet recording method according to an embodiment includes a step of depositing a resin liquid onto a recording medium and a step of depositing an aqueous ink composition onto the recording medium by using an ink jet method, the recording medium including the resin liquid deposited on the recording medium. Any selected amount of the aqueous ink composition can be ejected onto any selected region on a recording medium through the nozzles of the head of the ink jet recording apparatus described above.

Resin Liquid Deposition Step

A resin liquid deposition step is a step of depositing a resin liquid onto a recording medium, the resin liquid including a resin. In the present embodiment, for the resin liquid deposition step, the method for deposition is not limited to an ink jet method. For the resin liquid deposition step, another method, such as dip coating, roller coating, or spray coating, may be used. The recording apparatus includes a mechanism for depositing the resin liquid in any of these manners. Among these, using an ink jet method is preferable because, with an ink jet method, any selected amount of the resin liquid can be ejected onto any selected region on a recording medium.

As described above, as a result of deposition of the resin liquid, an adhesion layer is formed on a recording medium, and consequently, the aqueous ink composition wets and spreads uniformly, which results in improved abrasion resistance. In addition, a layer for receiving the aqueous ink composition is provided on the recording medium, which enables recording of image with the aqueous ink composition.

For formation of the adhesion layer on a recording medium, the amount of deposition of the resin of the resin liquid is preferably greater than or equal to 0.03 mg/inch$^2$, more preferably greater than or equal to 0.05 mg/inch$^2$, even more preferably greater than or equal to 0.10 mg/inch$^2$, and particularly preferably greater than or equal to 0.15 mg/inch$^2$. When the amount of deposition is within any of the above-mentioned ranges, excellent abrasion resistance and lamination strength, for example, are achieved, and therefore such an amount of deposition is preferable. Furthermore, such amounts of deposition are preferable also because the wettability and spreadability of ink on the surface of a recording medium can be adjusted and excellent ink image quality can be provided.

Furthermore, in terms of forming a uniform adhesion layer with a reduced non-uniformity, the amount of deposition of the resin is preferably less than or equal to 0.5 mg/inch$^2$, more preferably less than or equal to 0.35 mg/inch$^2$, even more preferably less than or equal to 0.30 mg/inch$^2$, still even more preferably less than or equal to 0.25 mg/inch$^2$, and particularly preferably less than or equal to 0.20 mg/inch$^2$.

In the recording method of the present embodiment, when the "amount of deposition of the resin of the resin liquid" is mentioned, the meaning is as follows recording, the region of a recording medium on which the resin liquid and the ink composition are deposited has a portion in which the amount of deposition of the resin included in the resin liquid corresponds to the amount of deposition mentioned.

Furthermore, in the recording method of the present embodiment, when the "amount of deposition of the resin of the ink composition" is mentioned, the meaning is as follows: in recording, the region of a recording medium on which the resin liquid and the ink composition are deposited has a portion in which the amount of deposition of the resin included in the ink composition corresponds to the amount of deposition mentioned.

Furthermore, in the recording method of the present embodiment, when the "total amount of deposition of the resin of the ink composition and the resin of the resin liquid" is mentioned, the meaning is as follows: in recording, the region of a recording medium on which the resin liquid and the ink composition are deposited has a portion in which the total amount of deposition of the resin included in the resin liquid and the resin included in the ink composition corresponds to the amount of deposition mentioned.

Preferably, the "amount of deposition of the resin of the resin liquid" corresponds to the amount of deposition of the resin included in the resin liquid in the portion having the greatest amount of deposition of the resin included in the resin liquid, in the region of a recording medium on which the resin liquid and the ink composition are deposited.

Furthermore, preferably, the "amount of deposition of the resin of the ink composition" corresponds to the amount of deposition of the resin included in the ink composition in the portion having the greatest amount of deposition of the resin included in the ink composition, in the region of a recording medium on which the resin liquid and the ink composition are deposited.

Furthermore, preferably, the "total amount of deposition of the resin of the ink composition and the resin of the resin liquid" corresponds to the total amount of deposition of the resins in the portion having the greatest total amount of deposition of the resin included in the resin liquid and the resin included in the ink composition, in the region of a recording medium on which the resin liquid and the ink composition are deposited.

The ink jet recording method of the present embodiment may include a step of evaporating the resin liquid, which may be performed after the resin liquid deposition step and before an aqueous ink composition deposition step. In this case, it is preferable to evaporate the resin liquid to such an extent that the adhesion layer deposited on a recording medium does not provide a sticky feel when touched. It is preferable that the evaporation of the resin liquid be performed with heating, from the standpoint of promoting the fusion-bonding of the resin included in the resin liquid and promoting the evaporation of the organic solvent and water included in the resin liquid.

Aqueous Ink Composition Deposition Step

An aqueous ink composition deposition step is a step of recording an image by depositing, by using an ink jet recording method, a pigment-containing aqueous ink composition onto the adhesion layer formed from the resin liquid on the recording medium, in any selected region of the recording medium. The recording apparatus includes a head for ejecting the aqueous ink composition. The head is a mechanism for depositing the aqueous ink composition.

To improve the abrasion resistance of the image recorded in the aqueous ink composition deposition step, it is preferable that the ink jet recording method include a step of evaporating the aqueous ink composition after the aqueous ink composition deposition step. In this case, by using the evaporation method described above, the amount of a residual portion of the deposited organic solvent can be reduced, and consequently, the abrasion resistance of the image can be further improved.

The amount of deposition of the resin of the ink composition deposited on a recording medium is preferably less than or equal to 1.0 mg/inch$^2$, more preferably less than or equal to 0.8 mg/inch$^2$, and even more preferably less than or equal to 0.40 mg/inch$^2$. When the amount of the resin deposited on a recording medium is less than or equal to the upper limit mentioned above, a uniform resin coating can be formed, which results in improved abrasion resistance. Furthermore, the amount of deposition of the resin of the ink composition is preferably greater than or equal to 0.1 mg/inch$^2$ and more preferably greater than or equal to 0.2 mg/inch$^2$. When the amount of deposition is greater than or equal to the lower limit mentioned above, excellent abrasion resistance, for example, is achieved, and therefore such an amount of deposition is preferable.

The total amount of deposition of the resin of the ink composition and the resin of the resin liquid deposited on a recording medium is preferably less than or equal to 2.0 mg/inch$^2$, more preferably less than or equal to 1.0 mg/inch$^2$, even more preferably less than or equal to 0.8 mg/inch$^2$, and particularly preferably less than or equal to 0.5 mg/inch$^2$. Furthermore, the total amount of deposition of the resins is preferably greater than or equal to 0.2 mg/inch$^2$ and more preferably greater than or equal to 0.3 mg/inch$^2$. When the amount of deposition is within any of the above-mentioned ranges, excellent abrasion resistance, for example, is achieved, and therefore such an amount of deposition is preferable.

Furthermore, the ratio of the amount of deposition of the resin of the aqueous ink composition deposited on a recording medium to the amount of deposition of the resin of the resin liquid deposited on the recording medium is preferably greater than or equal to 1:1, more preferably greater than 1:1, and even more preferably greater than or equal to 1.5:1. Thus, the amount of deposition of the pigment included in the aqueous ink composition is increased, which enhances color development in recorded matter, and the amount of deposition of the resin included in the aqueous ink composition is increased, which results in improved abrasion resistance of the recorded matter. In non-limiting examples, the ratio is preferably less than or equal to 10:1, more preferably less than or equal to 5:1, and even more preferably less than or equal to 4:1.

It is preferable that the ratio be a ratio of the portion having the greatest amount of deposition of the ink composition in the region of a recording medium on which the resin liquid and the ink composition are deposited. The amount of deposition of the ink composition may be varied depending on the image to be recorded on a recording medium. However, when the ratio is within any of the above-mentioned ranges, excellent abrasion resistance and lamination strength are achieved, and therefore such a ratio is preferable.

The amount of deposition of the organic solvent of the ink composition deposited on a recording medium is preferably less than or equal to 0.8 mg/inch$^2$, more preferably less than or equal to 0.5 mg/inch$^2$, and even more preferably less than or equal to 0.4 mg/inch$^2$. Furthermore, the amount of deposition of the organic solvent of the ink composition is preferably greater than or equal to 0.1 mg/inch$^2$ and more preferably greater than or equal to 0.2 mg/inch$^2$. When the amount of deposition of the organic solvent of the ink composition is within any of the above-mentioned ranges, excellent abrasion resistance, lamination strength, and image quality, for example, are achieved, and therefore such an amount of deposition is preferable.

The amount of deposition of the organic solvent of the resin liquid deposited on a recording medium is preferably less than or equal to 0.5 mg/inch$^2$, more preferably less than or equal to 0.3 mg/inch$^2$, and even more preferably less than or equal to 0.2 mg/inch$^2$. Furthermore, the amount of deposition of the organic solvent of the resin liquid is preferably greater than or equal to 0.05 mg/inch$^2$ and more preferably greater than or equal to 0.1 mg/inch$^2$. When the amount of deposition of the organic solvent of the resin liquid is within any of the above-mentioned ranges, excellent abrasion resistance, lamination strength, and image quality, for example, are achieved, and therefore such an amount of deposition is preferable.

The total amount of deposition of the organic solvent of the ink composition and the organic solvent of the resin liquid deposited on a recording medium is preferably less than or equal to 1.0 mg/inch$^2$, more preferably less than or equal to 0.8 mg/inch$^2$, and even more preferably less than or equal to 0.5 mg/inch$^2$. Furthermore, the total amount of deposition of the organic solvents is preferably greater than or equal to 0.2 mg/inch$^2$ and more preferably greater than or equal to 0.3 mg/inch$^2$. When the total amount of deposition of the organic solvents is within any of the above-mentioned ranges, excellent abrasion resistance, lamination strength, and image quality, for example, are achieved, and therefore such a total amount of deposition is preferable.

In the recording method of the present embodiment, when the "amount of deposition of the organic solvent of the resin liquid" is mentioned, the meaning is as follows: in recording, the region of a recording medium on which the resin liquid and the ink composition are deposited has a portion in which the amount of deposition of the organic solvent included in the resin liquid corresponds to the amount of deposition mentioned.

Furthermore, in the recording method of the present embodiment, when the "amount of deposition of the organic solvent of the ink composition" is mentioned, the meaning is as follows: in recording, the region of a recording medium on which the resin liquid and the ink composition are deposited has a portion in which the amount of deposition of the organic solvent included in the ink composition corresponds to the amount of deposition mentioned.

Furthermore, in the recording method of the present embodiment, when the "total amount of deposition of the organic solvent of the ink composition and the organic solvent of the resin liquid" is mentioned, the meaning is as follows: in recording, the region of a recording medium on which the resin liquid and the ink composition are deposited has a portion in which the total amount of deposition of the organic solvent included in the resin liquid and the organic solvent included in the ink composition corresponds to the amount of deposition mentioned.

Preferably, the "amount of deposition of the organic solvent of the resin liquid" corresponds to the amount of deposition of the organic solvent of the resin liquid in the portion having the greatest amount of deposition of the organic solvent of the resin liquid in the region of a recording medium on which the resin liquid and the ink composition are deposited.

Furthermore, preferably, the "amount of deposition of the organic solvent of the ink composition" corresponds to the amount of deposition of the organic solvent of the ink composition in the portion having the greatest amount of deposition of the organic solvent of the ink composition in the region of a recording medium on which the resin liquid and the ink composition are deposited.

Furthermore, preferably, the "total amount of deposition of the organic solvent of the ink composition and the organic solvent of the resin liquid" corresponds to the total amount of deposition of the organic solvents in the portion having the greatest total amount of deposition of the organic solvent of the resin liquid and the organic solvent of the ink composition in the region of a recording medium on which the resin liquid and the ink composition are deposited.

Furthermore, in recording, it is preferable that, in the portion having the greatest amount of deposition of the ink composition in the region of a recording medium on which the resin liquid and the ink composition are deposited, the amount of deposition of the ink composition be greater than the amount of deposition of the resin liquid, specifically, by a factor of greater than or equal to 1.5. With the present embodiment, even in the case in which the amount of deposition of the ink composition is increased in accordance with an image to be recorded, excellent abrasion resistance and lamination strength can be achieved.

The recording method may further include a step of laminating the recording surface of a recording medium, which will be described below.

It is preferable that recorded matter obtained by using the ink jet recording method described above be laminated to be put into use. When the content of the organic solvent in the aqueous ink composition is less than or equal to 12.0 mass %, the adhesion strength between the recorded matter and the laminate can be improved. Alternatively, the obtained recorded matter may be used as it is for display applications or the like.

For example, the lamination can be carried out by stacking a protective film on the recording surface of recorded matter, specifically, for example, by laminating a film. Alternatively, in a non-limiting example, a known adhesive may be applied to the recording surface of recorded matter, and a film may be laminated to the adhesive, or a film including an adhesive thereon may be laminated to the recording surface of recorded matter. In another non-limiting example, a molten resin, in which a film material is melted, may be used. Specifically, a molten resin may be extruded onto the recording surface of recorded matter to form a film on the recording surface of the recorded matter. Examples of laminate materials, such as films, include resin films. Laminating recorded matter is preferable because, with lamination, excellent light resistance is provided to the recorded matter, and, in cases in which the recorded matter is handled roughly, for example, hit by a solid object, excellent protection is provided. Furthermore, after the recorded matter and a film are laminated together, it is preferable to press the resultant with further heating or at normal temperature to achieve a sufficient adhesion.

The present disclosure will now be described with reference to examples and comparative examples. The examples described below are in no way intended to limit the present disclosure.

Preparation of Resin Liquid and Aqueous Ink Composition

Components were mixed together according to the mixing ratio listed in Table 1 and stirred, and the resultant was then filtered through a filter having a pore size of 8 μm. Thus, resin liquids and ink compositions were obtained. Main materials for the resin liquid and the ink composition are described below. In Table 1 below, the numerical values are expressed on a mass % basis, with the total being 100.0 mass %. The contents of the pigment, resin, and surfactant are expressed on an effective components (solids) basis.

The pigment was a pigment dispersion liquid prepared in advance in the following manner. A pigment and a dispersant (not shown in Table 1) were mixed with water and stirred. The dispersant was a water-soluble styrene-acrylic-based resin. The mass ratio between the pigment and the dispersant was 1:0.5. The thus prepared pigment dispersion liquid was used to prepare the ink composition.

Materials for Resin Liquid and Aqueous Ink Composition

The materials for the resin liquid and the aqueous ink composition used in the examples and the comparative examples are listed below.

Pigment
  C.I. Pigment Blue 15:3
Resin
  Acrylic-based resin emulsion (manufactured by BASF, trade name: Joncryl 62J)
  Urethane-based resin emulsion (manufactured by Mitsui Chemicals, Inc., trade name: TAKELAC W-6061)
Organic Solvent
  1,2-Hexanediol
  Propylene glycol
  2-Pyrrolidone
  Glycerol
  Triethylene Glycol Monobutyl Ether
Surfactant
  Silicone-based surfactant (manufactured by BYK Japan KK, trade name: BYK-348)

TABLE 1

| | | Resin liquid | | | | | Aqueous ink composition | | | | | | | | | |
|---|---|---|---|---|---|---|---|---|---|---|---|---|---|---|---|---|
| | Composition No. | K1 | K2 | K3 | K4 | K5 | C1 | C2 | C3 | C4 | C5 | C6 | C7 | C8 | C9 | C10 |
| Resin | Acrylic-based resin | 0.0 | 0.0 | 0.0 | 4.0 | 0.0 | 0.0 | 0.0 | 4.0 | 0.0 | 0.0 | 0.0 | 0.0 | 0.0 | 0.0 | 0.0 |
| | Urethane-based resin | 2.0 | 4.0 | 6.0 | 0.0 | 4.0 | 2.0 | 4.0 | 0.0 | 4.0 | 4.0 | 4.0 | 4.0 | 4.0 | 4.0 | 4.0 |
| Pigment | Pigment Blue 15:3 | 0.0 | 0.0 | 0.0 | 0.0 | 0.0 | 4.0 | 4.0 | 4.0 | 4.0 | 4.0 | 4.0 | 4.0 | 4.0 | 4.0 | 4.0 |
| Surfactant | Silicone-based surfactant | 0.7 | 0.7 | 0.7 | 0.7 | 0.7 | 0.7 | 0.7 | 0.7 | 0.7 | 0.7 | 0.7 | 0.7 | 0.7 | 0.7 | 0.7 |
| Organic solvent | Propylene glycol | 0.0 | 0.0 | 0.0 | 0.0 | 2.0 | 0.0 | 0.0 | 0.0 | 13.0 | 8.0 | 3.0 | 0.0 | 4.0 | 0.0 | 0.0 |
| | 1,2-Hexanediol | 5.0 | 5.0 | 5.0 | 5.0 | 6.0 | 5.0 | 5.0 | 5.0 | 5.0 | 5.0 | 5.0 | 5.0 | 6.0 | 3.0 | 0.0 |
| | Triethylene Glycol Monobutyl Ether | 0.0 | 0.0 | 0.0 | 0.0 | 0.0 | 0.0 | 0.0 | 0.0 | 0.0 | 0.0 | 0.0 | 0.0 | 0.0 | 0.0 | 5.0 |
| | 2-Pyrrolidone | 0.0 | 0.0 | 0.0 | 0.0 | 0.0 | 0.0 | 0.0 | 0.0 | 3.5 | 0.0 | 0.0 | 0.0 | 0.0 | 0.0 | 0.0 |
| | Glycerol | 0.0 | 0.0 | 0.0 | 0.0 | 0.0 | 0.0 | 0.0 | 0.0 | 0.0 | 0.0 | 0.0 | 3.0 | 0.0 | 0.0 | 0.0 |
| | Ion-exchanged water | Balance | Balance | Balance | Balance | Balance | Balance | Balance | Balance | Balance | Balance | Balance | Balance | Balance | Balance | Balance |
| | Total | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| | Amount of organic solvent(s) | 5.0 | 5.0 | 5.0 | 5.0 | 8.0 | 5.0 | 5.0 | 5.0 | 21.5 | 13.0 | 8.0 | 8.0 | 10.0 | 3.0 | 5.0 |

Production of Recorded Matter

Recording was performed on a recording medium (FOS-AQ OPP film (manufactured by Futamura Chemical Co., Ltd.)) by depositing the samples shown in Table 1, by performing the resin liquid deposition step and then the aqueous ink composition deposition step.

Ink Jet Recording Apparatus

The ink jet recording apparatus used was an ink jet printer (modified from a PX-G930 (trade name) printer, manufactured by Seiko Epson Corporation). A heater was attached to a platen (paper guide) of the apparatus to adjust the temperature of the platen to 50° C. for the recording.

Resin Liquid Deposition Step

The resin liquid shown in Table 1 was loaded into the head of the ink jet recording apparatus described above, and the resin liquid is deposited on the recording medium described above with a recording resolution of 1440×1440 dpi. The amount of deposition was adjusted such that the amount of deposition of the resin of the resin liquid shown in Table 2 and Table 3 was achieved.

After the resin liquid was deposited, the recording medium was discharged and then dried for 10 minutes in an oven heated to 90° C. Subsequently, the recording medium was placed again in the ink jet recording apparatus to perform the aqueous ink composition deposition step.

Aqueous Ink Composition Deposition Step

In the ink jet recording apparatus, the head contained the aqueous ink composition shown in Table 1 loaded therein. The aqueous ink composition was deposited onto the recording medium, which included the resin liquid deposited thereon, with a recording resolution of 1440×1440 dpi. The amount of deposition was adjusted such that the amount of deposition of the resin of the ink composition shown in Table 2 and Table 3 was achieved. The amounts of deposition of the organic solvents of the aqueous ink composition and the resin liquid are amounts calculated from the amounts of deposition of the resins and the composition tables of the compositions and are as shown in Tables 2 and 3.

After the aqueous ink composition was deposited, the recording medium was discharged and then dried for 10 minutes in an oven heated to 90° C. After the temperature was returned to normal temperature, the following evaluations were conducted immediately. For abrasion resistance, however, evaluations were made after storage for hours in an environment at normal temperature and humidity.

Evaluation of Abrasion Resistance

Evaluations of abrasion resistance of the obtained recorded matter were conducted using a Gakushin-type rubbing tester (manufactured by Tester Sangyo Co., Ltd., trade name: AB-301). In the evaluation of abrasion resistance, dry abrasion resistance and wet abrasion resistance were evaluated. Specifically, for dry abrasion resistance, the surface of the recording medium was rubbed with a friction block, which had a white cotton cloth attached thereto, under a load of 200 g. The rubbing was performed 100 times in a reciprocating manner. Subsequently, the degree of staining of the white cotton cloth and the degree of peeling of the recorded matter were visually observed. Furthermore, for wet abrasion resistance, a test as described above was conducted in accordance with JIS L 0803 by using a friction block having a white cotton cloth attached thereto, with the white cotton cloth having been immersed in water and wrung in advance. Subsequently, evaluations were conducted in accordance with the evaluation criteria described below. The results are shown in Tables 2 and 3.

Evaluation Criteria

A: No staining was observed on the white cotton cloth, and no peeling of the recorded matter was observed B: Slight staining was observed on the white cotton cloth, but no peeling of the recorded matter was observed C: Staining was observed on the white cotton cloth, and a minor amount of peeling of less than or equal to 20 area % was observed on the recorded matter D: Staining was observed on the white cotton cloth, and greater than 20 area % of peeling was observed on the recorded matter E: Staining was already observed on the white cotton cloth after the reciprocating rubbing was performed 10 times, and greater than 20 area % of peeling was observed on the recorded matter.

Evaluation of Lamination Strength

A CPP film, FHK2 (trade name of Futamura Chemical Co., Ltd.), which is a laminate film, was laminated to the recording surface of recorded matter obtained in each of the examples. The laminated recorded matter was left standing for five days at 40° C. and 80% RH. Subsequently, the recorded matter was visually observed, and the laminate film was peeled away from the recorded matter. Subsequently, evaluations were conducted in accordance with the evaluation criteria described below. The results are shown in Tables 2 and 3.

Evaluation Criteria

A: There were no air bubbles inside the laminate, and the laminate film was not easily peeled off B: There was a small number of air bubbles inside the laminate, and the laminate film was not easily peeled off C: There was a small number of air bubbles inside the laminate, and the laminate film was rather easily peeled off D: There was a considerable number of air bubbles inside the laminate, and the laminate film was easily peeled off Evaluation of Image Quality The image of the recorded matter was observed with a magnifying glass. Subsequently, evaluations were conducted in accordance with the evaluation criteria described below. The results are shown in Tables 2 and 3. In cases in which the ink had poor wetting and spreading properties, blank spots were observed. The blank spots are minute portions on a recording medium that are not filled with ink.

Evaluation Criteria

A: No blank spots were observed

B: A small number of blank spots were observed

C: A considerable number of blank spots were observed

TABLE 2

|  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 | Ex. 16 | Ex. 17 |
|---|---|---|---|---|---|---|---|---|---|---|---|---|---|---|---|---|---|
| Resin liquid composition No. | K1 | K1 | K1 | K1 | K1 | K2 | K2 | K2 | K2 | K2 | K3 | K2 | K2 | K2 | K4 | K5 | K2 |
| Aqueous ink composition No. | C1 | C2 | C3 | C2 | C2 | C1 | C2 | C3 | C6 | C7 | C1 | C8 | C9 | C10 | C2 | C2 | C2 |

TABLE 2-continued

| | | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 | Ex. 16 | Ex. 17 |
|---|---|---|---|---|---|---|---|---|---|---|---|---|---|---|---|---|---|---|
| Resin deposition amount (mg/inch$^2$) | Resin of resin liquid | 0.10 | 0.10 | 0.10 | 0.06 | 0.04 | 0.21 | 0.21 | 0.21 | 0.21 | 0.21 | 0.31 | 0.21 | 0.21 | 0.21 | 0.21 | 0.21 | 0.21 |
| | Resin of aqueous ink composition | 0.10 | 0.21 | 0.21 | 0.21 | 0.21 | 0.10 | 0.21 | 0.21 | 0.21 | 0.10 | 0.10 | 0.21 | 0.21 | 0.21 | 0.21 | 0.21 | 0.40 |
| | Total | 0.20 | 0.31 | 0.31 | 0.27 | 0.25 | 0.31 | 0.42 | 0.42 | 0.42 | 0.31 | 0.41 | 0.42 | 0.42 | 0.42 | 0.42 | 0.42 | 0.61 |
| Solvent deposition amount (mg/inch$^2$) | Organic solvent of resin liquid | 0.25 | 0.25 | 0.25 | 0.15 | 0.10 | 0.26 | 0.26 | 0.26 | 0.26 | 0.26 | 0.26 | 0.26 | 0.26 | 0.26 | 0.26 | 0.42 | 0.26 |
| | Organic solvent of aqueous ink composition | 0.25 | 0.26 | 0.26 | 0.26 | 0.26 | 0.25 | 0.26 | 0.26 | 0.42 | 0.20 | 0.25 | 0.53 | 0.16 | 0.26 | 0.26 | 0.26 | 0.50 |
| | Total | 0.50 | 0.51 | 0.51 | 0.41 | 0.36 | 0.51 | 0.53 | 0.53 | 0.68 | 0.46 | 0.51 | 0.79 | 0.42 | 0.53 | 0.53 | 0.68 | 0.76 |
| Evaluation results | Dry abrasion resistance | B | A | A | A | A | B | A | A | A | A | A | B | B | A | B | A | A |
| | Wet abrasion resistance | B | A | A | A | A | A | B | A | C | C | B | C | B | B | B | A | A |
| | Lamination strength | C | B | C | A | B | B | B | B | B | C | B | C | A | B | C | B | C |
| | Image quality | B | B | B | A | B | A | A | A | A | B | A | A | B | B | A | A | A |

TABLE 3

| | | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|
| | Resin liquid composition No. | — | — | — | — | — | K1 | K1 |
| | Aqueous ink composition No. | C1 | C2 | C3 | C4 | C5 | C4 | C5 |
| Resin deposition amount (mg/inch$^2$) | Resin of resin liquid | 0.00 | 0.00 | 0.00 | 0.00 | 0.00 | 0.10 | 0.10 |
| | Resin of aqueous ink composition | 0.10 | 0.21 | 0.21 | 0.21 | 0.21 | 0.21 | 0.21 |
| | Total | 0.10 | 0.21 | 0.21 | 0.21 | 0.21 | 0.31 | 0.31 |
| Solvent deposition amount (mg/inch$^2$) | Organic solvent of resin liquid | 0.00 | 0.00 | 0.00 | 0.00 | 0.00 | 0.25 | 0.25 |
| | Organic solvent of aqueous ink composition | 0.25 | 0.26 | 0.26 | 1.10 | 0.68 | 1.10 | 0.68 |
| | Total | 0.25 | 0.26 | 0.26 | 1.10 | 0.68 | 1.35 | 0.93 |
| Evaluation results | Dry abrasion resistance | B | A | A | A | A | A | A |
| | Wet abrasion resistance | E | D | D | E | D | D | D |
| | Lamination strength | D | D | D | D | D | D | D |
| | Image quality | C | C | C | C | C | A | A |

The evaluation results demonstrate that, in all of Examples, which included the step of depositing a resin liquid and the step of depositing an aqueous ink composition in which the total content of organic solvents is less than or equal to 12.0 mass %, the recorded matter had excellent abrasion resistance (wet abrasion resistance) and lamination strength. In contrast, in all of Comparative Examples, which did not satisfy the conditions of Examples, the recorded matter had low abrasion resistance and lamination strength. More details are described below.

Example 7, Example 9, and Example 12 demonstrate that lower contents of the organic solvent in the aqueous ink composition tended to result in improved wet abrasion resistance.

Example 2 and Example 7 demonstrate that smaller total amounts, which are totals of the amount of the resin of the resin liquid (resin deposition amount) and the amount of the resin of the aqueous ink composition (resin deposition amount), tended to result in improved wet abrasion resistance. On the other hand, Example 6 demonstrates that amounts of deposition of the resin of the ink that were not small resulted in relatively high dry abrasion resistances.

Example 17 is an example in which the amount of deposition of the resin of the ink composition was increased by increasing the amount of deposition of the ink composition. Even when the amount of deposition of the ink composition was large, a good lamination strength was achieved. It was found that even in cases in which the amount of deposition of the ink composition is increased in accordance with an image to be recorded, excellent abrasion resistance and lamination strength were achieved as a result of using the aqueous ink composition of the embodiment. In addition, while the amount of deposition of the ink composition was increased, the amount of deposition of the resin liquid was not increased compared with the other examples, but nevertheless, excellent abrasion resistance and lamination strength were achieved.

Comparative Examples 1 to 3 demonstrate that when the step of depositing a resin liquid was absent, abrasion resistance was low because no adhesion layer was formed on the recording medium. Comparative Example 6 and Comparative Example 7 demonstrate that even in cases in which the steps of depositing a resin liquid and depositing an aqueous ink composition were included, wet abrasion resistance and lamination strength were adversely affected when the content of the organic solvent in the aqueous ink composition was greater than 10 mass % relative to the total mass of the aqueous ink composition.

Further features that are derived from embodiments are described below.

An ink jet recording method includes a step of depositing a resin liquid onto a recording medium, the resin liquid including a resin, and a step of depositing an aqueous ink composition onto the recording medium by using an ink jet method, the recording medium including the resin liquid deposited on the recording medium. In the aqueous ink composition, the total content of organic solvents is less than or equal to 12.0 mass % relative to the total mass of the aqueous ink composition.

With this configuration, the abrasion resistance of recorded matter is improved. Specifically, the resin liquid is deposited onto a low-absorption or non-absorption recording media, thereby forming an adhesion layer of resin particles on the recording medium. In cases in which the aqueous ink composition is deposited on a low-absorption or non-absorption recording medium, the aqueous ink composition tends to be repelled from the surface of the recording medium, and consequently, uniform wetting of the aqueous ink composition cannot be achieved. When the surface of a recording medium has an adhesion layer formed from the resin liquid, the aqueous ink composition tends not to be repelled from the recording medium, and accordingly, the aqueous ink composition wets and spreads on the adhesion layer, which increases the bonding surface between the aqueous ink composition and the adhesion layer. Consequently, the adhesion of the aqueous ink composition to the recording medium is increased via the adhesion layer, which results in improved abrasion resistance of recorded matter.

Furthermore, if the total content of organic solvents is greater than 12 mass % relative to the total mass of the aqueous ink composition, a residual portion of the organic solvent hinders the formation of a cured coating of resin particles. As a result, it is unlikely that a uniform cured coating will be formed. When the total content of organic solvents is less than or equal to 12 mass %, the amount of the organic solvent that hinders the formation of a cured coating is reduced, which results in formation of a uniform cured coating and, consequently, improved abrasion resistance. In addition, even in a case in which water adheres to the recorded matter, the residual portion of the organic solvent dissolves into the water because the amount of the residual portion of the organic solvent is small, and therefore, the occurrence of degradation of the resin coating is reduced. As a result, the water resistance of the resin coating is improved, which results in improved wet abrasion resistance.

It is preferable that the ink jet recording method be an ink jet recording method in which, in the step of depositing the resin liquid, the amount of deposition of the resin included in the resin liquid onto a recording medium is 0.05 mg/inch$^2$ or greater and 0.35 mg/inch$^2$ or less.

With this configuration, the amount of deposition of the resin included in the resin liquid is to be greater than or equal to 0.05 mg/inch$^2$. Consequently, an adhesion layer is formed on the surface of a recording medium. Furthermore, the amount of deposition of the resin included in the resin liquid is to be less than or equal to 0.35 mg/inch$^2$. Consequently, a uniform resin coating can be easily formed. Accordingly, the adhesion between the adhesion layer on the surface of a recording medium and the aqueous ink composition is improved, which results in improved abrasion resistance.

In the ink jet recording method, it is preferable that the at least one organic solvent in the aqueous ink composition is selected from the group consisting of 1,2-alkanediols and glycol ethers.

With this configuration, the wetting and spreading of the ink on the adhesion layer that occurs when the aqueous ink composition is deposited can be controlled, which results in improved abrasion resistance of the image.

In the ink jet recording method, it is preferable that, in the aqueous ink composition, a total content of organic solvents having a normal boiling point higher than 280° C. is less than or equal to 1.0 mass % relative to the total mass of the aqueous ink composition.

With this configuration, the total content of organic solvents having a normal boiling point higher than 280° C. in the aqueous ink composition is to be less than or equal to 1.0 mass %. Consequently, the amount of the residual portion of the organic solvent in the deposited aqueous ink composition is reduced, which results in improved abrasion resistance.

In the ink jet recording method, it is preferable that the total content of organic solvents in the aqueous ink composition be less than or equal to 5.0 mass % relative to the total mass of the aqueous ink composition.

With this configuration, lower contents of the organic solvent in the aqueous ink composition result in smaller amounts of the residual portion of the organic solvent after the aqueous ink composition is deposited onto the recording medium, which results in improved abrasion resistance.

In the ink jet recording method, it is preferable that the recording surface of the recording medium include a film made from a polyolefin.

With this configuration, a non-absorption or low-absorption film includes polyolefin, and consequently, an adhesion layer can be easily formed on the recording medium. As a result, an effect of improving the abrasion resistance of recorded matter is produced.

In the ink jet recording method, it is preferable that the total content of organic solvents in the resin liquid be less than or equal to 12.0 mass % relative to the total mass of the resin liquid.

With this configuration, the total content of organic solvents in the resin liquid is to be less than or equal to 12.0 mass %. Consequently, the amount of a residual portion of the organic solvent that remains in the adhesion layer deposited on a recording medium is reduced, which results in improved abrasion resistance.

In the ink jet recording method, it is preferable that the aqueous ink composition have a viscosity, at 20° C., of less than or equal to 4 mPa·s.

With this configuration, the viscosity, at 20° C., of the aqueous ink composition is to be less than or equal to 4 mPa·s. Consequently, stable ejection is achieved in the ink jet recording method.

In the ink jet recording method, it is preferable that the resin liquid include at least one urethane-based resin, and the aqueous ink composition include at least one selected from the group consisting of acrylic-based resins and urethane-based resins.

With this configuration, the resin liquid is to include at least one urethane-based resin. Consequently, the adhesion layer that is formed on a recording medium has increased wettability. In addition, the aqueous ink composition is to include at least one selected from the group consisting of acrylic-based resins and urethane-based resins. Consequently, the resin coating has increased strength, which results in improved abrasion resistance of recorded matter.

In the ink jet recording method, it is preferable that the aqueous ink composition include a resin, and that the total of the amount of deposition of the resin included in the resin liquid and the amount of deposition of the resin included in the aqueous ink composition be less than or equal to 0.8 mg/inch$^2$ in a region where the resin liquid and the aqueous ink composition are deposited onto the recording medium.

With this configuration, the total amount of deposition of the resins deposited on a recording medium is to be less than or equal to 0.8 mg/inch$^2$. Consequently, even with a slight amount of evaporation of moisture, a uniform resin coating can be formed, which results in improved abrasion resistance of recorded matter.

In the ink jet recording method, it is preferable that the resin included in the resin liquid be in the form of resin microparticles.

With this configuration, the resin is to be included in the form of a resin emulsion including resin microparticles dispersed in an aqueous medium. In this case, resin liquid storage stability is improved, and stable ejection is achieved in the ink jet recording method.

In the ink jet recording method, it is preferable that, in the step of depositing the resin liquid, the resin liquid be deposited onto a recording medium by using an ink jet recording method.

With this configuration, an ink jet method is to be used as a recording method, and therefore, control can be made for depositing any selected amount of the resin liquid onto any selected region on a recording medium. Consequently, a uniform resin coating can be easily formed.

In the ink jet recording method, it is preferable that recorded matter obtained by using an ink jet recording method be laminated to be put into use.

In this configuration, the adhesion strength between the recorded matter and the laminate is improved because the amount of the residual portion of the organic solvent in the recorded matter is small, and therefore, even when the recorded matter is laminated, an influence that may be caused when the residual portion of the organic solvent evaporates over time is small.

In the ink jet recording method, it is preferable that the ratio of the amount of deposition of the resin of the aqueous ink composition to the amount of deposition of the resin of the resin liquid be greater than or equal to 1:1 in a region of the recording medium where the resin liquid and the aqueous ink composition are deposited onto the recording medium.

With this configuration, the ratio of the amount of deposition of the resin of the aqueous ink composition to the amount of deposition of the resin of the resin liquid is to be greater than or equal to 1:1. Consequently, the amount of deposition of the resin included in the aqueous ink composition is increased, which results in improved abrasion resistance of recorded matter.

An ink set includes an aqueous ink jet ink composition and a resin liquid. In the aqueous ink jet ink composition, the total content of organic solvents is less than or equal to 12.0 mass % relative to the total mass of the aqueous ink jet ink composition. The resin liquid is used as a priming liquid for the aqueous ink jet ink composition.

With this configuration, the ink set improves the abrasion resistance of recorded matter.

An ink jet recording apparatus includes a mechanism that deposits a resin liquid onto a recording medium, the resin liquid including a resin, and a mechanism that deposits an aqueous ink composition, by using an ink jet method, onto the recording medium on which the resin liquid was deposited. In the aqueous ink composition, the total content of organic solvents is less than or equal to 12.0 mass % relative to the total mass of the aqueous ink composition.

With this configuration, the ink jet recording apparatus provided improves the abrasion resistance of recorded matter that is recorded on a recording medium.

What is claimed is:

1. An ink jet recording method comprising:
   depositing an aqueous resin liquid onto a recording medium, the aqueous resin liquid including a resin; and
   depositing an aqueous ink composition, by using an ink jet method, onto the recording medium on which the aqueous resin liquid was deposited,
   wherein in the aqueous ink composition, a total content of organic solvents is less than or equal to 7.0 mass % relative to a total mass of the aqueous ink composition,
   wherein in the aqueous resin liquid, a total content of organic solvents is less than or equal to 7.0 mass % relative to a total mass of the aqueous resin liquid,
   in the depositing of the aqueous resin liquid, an amount of the resin included in the aqueous resin liquid deposited onto the recording medium is 0.04 mg/inch$^2$ or greater and 0.31 mg/inch$^2$ or less, and an amount of the organic solvents in the aqueous resin liquid deposited onto the recording medium is 0.1 mg/inch$^2$ or greater and 0.42 mg/inch$^2$ or less, and
   a total amount of the organic solvents in each of the aqueous resin liquid and the aqueous ink composition that are deposited on the recording medium is less than or equal to 1.0 mg/inch$^2$.

2. The ink jet recording method according to claim 1, wherein, in the depositing of the aqueous resin liquid, an amount of the resin included in the aqueous resin liquid deposited onto the recording medium is 0.06 mg/inch$^2$ or greater and 0.31 mg/inch$^2$ or less.

3. The ink jet recording method according to claim 1, wherein, in the aqueous ink composition, at least one organic solvent of the total content of organic solvents is selected from the group consisting of 1,2-alkanediols and glycol ethers.

4. The ink jet recording method according to claim 1, wherein, in the aqueous ink composition, a total content of organic solvents having a normal boiling point higher than 280° C. is less than or equal to 1.0 mass % relative to the total mass of the aqueous ink composition.

5. The ink jet recording method according to claim 1, wherein, in the aqueous ink composition, the total content of organic solvents is less than or equal to 5.0 mass % relative to the total mass of the aqueous ink composition.

6. The ink jet recording method according to claim 1, wherein a recording surface of the recording medium includes a film made from a polyolefin.

7. The ink jet recording method according to claim 1, wherein, in the aqueous resin liquid, a total content of organic solvents is less than or equal to 5.0 mass % relative to a total mass of the aqueous resin liquid.

8. The ink jet recording method according to claim 1, wherein the aqueous ink composition has a viscosity, at 20° C., of less than or equal to 4 mPa·s.

9. The ink jet recording method according to claim 1, wherein
   the aqueous resin liquid includes at least one urethane-based resin, and
   the aqueous ink composition includes at least one selected from the group consisting of acrylic-based resins and urethane-based resins.

10. The ink jet recording method according to claim 1, wherein the aqueous ink composition includes a resin, and a total of an amount of the resin included in the aqueous resin liquid and an amount of the resin included in the aqueous ink composition is less than or equal to 0.8 mg/inch$^2$ in a region where the aqueous resin liquid and the aqueous ink composition are deposited onto the recording medium.

11. The ink jet recording method according to claim 1, wherein the resin included in the aqueous resin liquid is in a form of resin microparticles.

12. The ink jet recording method according to claim 1, wherein, in the depositing of the aqueous resin liquid, the aqueous resin liquid is deposited onto the recording medium by using an ink jet recording method.

13. The ink jet recording method according to claim 1, wherein recorded matter obtained by using the ink jet recording method is laminated to be put into use.

14. The ink jet recording method according to claim 1, wherein a ratio of an amount of deposition of a resin of the aqueous ink composition to an amount of deposition of the resin of the aqueous resin liquid is greater than or equal to 1 in a region of the recording medium, the region where the aqueous resin liquid and the aqueous ink composition are deposited onto the recording medium.

15. The ink jet recording method according to claim 1, wherein in the aqueous ink composition, the total content of organic solvents is 0.5 to 7.0 mass % relative to the total mass of the aqueous ink composition, and in the aqueous resin liquid, the total content of organic solvents is 0.1 to 7.0 mass % relative to a total mass of the aqueous resin liquid.

16. The ink jet recording method according to claim 1, wherein the total amount of the organic solvents in each of the aqueous resin liquid and the aqueous ink composition that are deposited on the recording medium is 0.2 to 0.8 mg/inch$^2$.

17. The ink jet recording method according to claim 1, wherein an amount of the organic solvents in the aqueous resin liquid that are deposited on the recording medium is 0.1 mg/inch$^2$ or greater and 0.26 mg/inch$^2$ or less.

18. The ink jet recording method according to claim 1, wherein an amount of the organic solvents in the aqueous ink composition that are deposited on the recording medium is 0.8 mg/inch$^2$ or less.

* * * * *